(12) United States Patent
Garrard et al.

(10) Patent No.: US 11,650,108 B2
(45) Date of Patent: May 16, 2023

(54) PULSE SWITCHED HIGH SIDE DRIVER FOR VEHICLE SENSOR BACKGROUND

(71) Applicant: Ford Global Technologies, LLC, Dearborn, MI (US)

(72) Inventors: Mike Robert Garrard, Chelmsford (GB); Ibrahim Sonat, Dearborn, MI (US); Vishal Desai, Rayleigh (GB); Roberto Teran, Jr., Livonia, MI (US); Ed A. Schoenberg, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 17/110,434

(22) Filed: Dec. 3, 2020

(65) Prior Publication Data
US 2022/0178769 A1 Jun. 9, 2022

(51) Int. Cl.
*G01K 13/024* (2021.01)
*F01N 11/00* (2006.01)
(Continued)

(52) U.S. Cl.
CPC .......... *G01K 13/024* (2021.01); *F01N 11/002* (2013.01); *G01K 7/22* (2013.01);
(Continued)

(58) Field of Classification Search
CPC .......... G01K 13/024; G01K 7/22; G01K 7/24; G01K 2205/04; F01N 11/002; F01N 11/00
See application file for complete search history.

(56) References Cited

U.S. PATENT DOCUMENTS

| | | | | |
|---|---|---|---|---|
| 3,946,198 A | * | 3/1976 | Foote | G01N 27/122 219/419 |
| 4,141,326 A | * | 2/1979 | Wolber | F02M 21/0206 123/703 |

(Continued)

OTHER PUBLICATIONS

NGK Spark Plug, "Exhaust Gas Temperature Sensors", NGK Spark Plug Europe GmbH, Mar. 20, 2020, 5 pages.
(Continued)

*Primary Examiner* — Nathaniel T Woodward
*Assistant Examiner* — Philip L Cotey
(74) *Attorney, Agent, or Firm* — Frank Lollo; Eversheds Sutherland (US) LLP

(57) ABSTRACT

Systems, methods, and computer-readable media are disclosed for a pulse switched high side driver for vehicle sensor. An example method may include switching a transistor of a vehicle circuit to connect a first resistor to a vehicle sensor for a first time period in which exhaust gas temperature values of the vehicle are within a first range of exhaust gas temperatures values. The example method may also include switching, by providing a pulse-width modulation (PWM) signal with an on signal value, the transistor to connect a second resistor to a vehicle sensor for a second period of time in which exhaust gas temperature values of the vehicle are within a second range of exhaust gas temperatures values that are greater than the first range of exhaust gas temperature values, wherein the second resistor and vehicle sensor are also included in the vehicle circuit, wherein the second resistor is in parallel with a first resistor and connected between the transistor and the vehicle sensor. The example method may also include switching, by providing a pulse-width modulation (PWM) signal with an off signal value, the transistor to disconnect the second resistor from the vehicle sensor for a third period of time, the third period of time being greater than the second period of time.

(Continued)

The example method may also include reading, using an analog to digital converter (ADC) an output of the vehicle sensor during or after the first period of time.

17 Claims, 4 Drawing Sheets

(51) Int. Cl.
   *G01K 7/22* (2006.01)
   *G01K 7/24* (2006.01)
(52) U.S. Cl.
   CPC ............. *F01N 11/00* (2013.01); *G01K 7/24* (2013.01); *G01K 2205/04* (2013.01)

(56) References Cited

U.S. PATENT DOCUMENTS

| | | | | |
|---|---|---|---|---|
| 4,153,023 | A | * | 5/1979 | Asano ................. F02D 41/1455 123/693 |
| 4,213,181 | A | * | 7/1980 | Carp .................... F02D 41/266 700/282 |
| 4,255,789 | A | * | 3/1981 | Hartford ................. H02H 3/24 123/480 |
| 4,510,036 | A | * | 4/1985 | Takeuchi ........... G01N 27/4065 338/307 |
| 5,740,675 | A | * | 4/1998 | Shimasaki ............ F01N 3/2013 60/284 |
| 2003/0178016 | A1 | * | 9/2003 | Nebiyeloul-Kifle ....................... G01M 15/104 73/114.75 |
| 2015/0041319 | A1 | * | 2/2015 | Yamada .................. F01N 11/00 204/427 |
| 2016/0201540 | A1 | * | 7/2016 | Matsuoka ............. F01N 13/008 73/114.75 |
| 2021/0348540 | A1 | * | 11/2021 | Szczepanski ........... F01N 3/021 |
| 2021/0363905 | A1 | * | 11/2021 | Szczepanski ......... F01N 11/002 |

OTHER PUBLICATIONS

Stefan Carstens, "Exhaust Gas Temperature Sensors", Dieselnet Technology, Dieselnet Technology Guide: Sensors for Engine and Emission Control, May 2016, 3 pages.

* cited by examiner

PULSE SWITCHED HIGH SIDE DRIVER FOR VEHICLE SENSOR BACKGROUND

BACKGROUND

Vehicles may include a number of different types of sensors that may be used to measure various data points relating to the operation of different vehicle components. For example, a vehicle may include one or more Exhaust Gas Temperature (EGT) sensors that may be used to measure the temperature of exhaust gas produced by the vehicle. Data pertaining to the exhaust gas temperature may be important for a number of purposes, such as controlling regeneration of the particulate filter that may be used to capture soot and other particulate matter in diesel engine vehicles, for example. Capturing data relating to the exhaust gas temperature may be challenging because the sensors capturing the data may need to be accurate over a wide range of temperatures. For example, the sensors may need to be accurate from as low as −40° C. to up as high as 400° C. to 600° C. (for example, for gasoline engines), 500° C. to 700° C. (for example, for diesel engines), and even up to as high as 850° C. in some instances. In some instances, thermistors may be used as these EGT sensors. However, thermistors may be associated with a third order logarithmic response, so they may experience a large change in resistance across a given temperature range, which may result in data inaccuracies (and an inability to read data from the sensor in some cases) at both ends of the exhaust gas temperature range (for example, very low and/or very high temperatures).

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
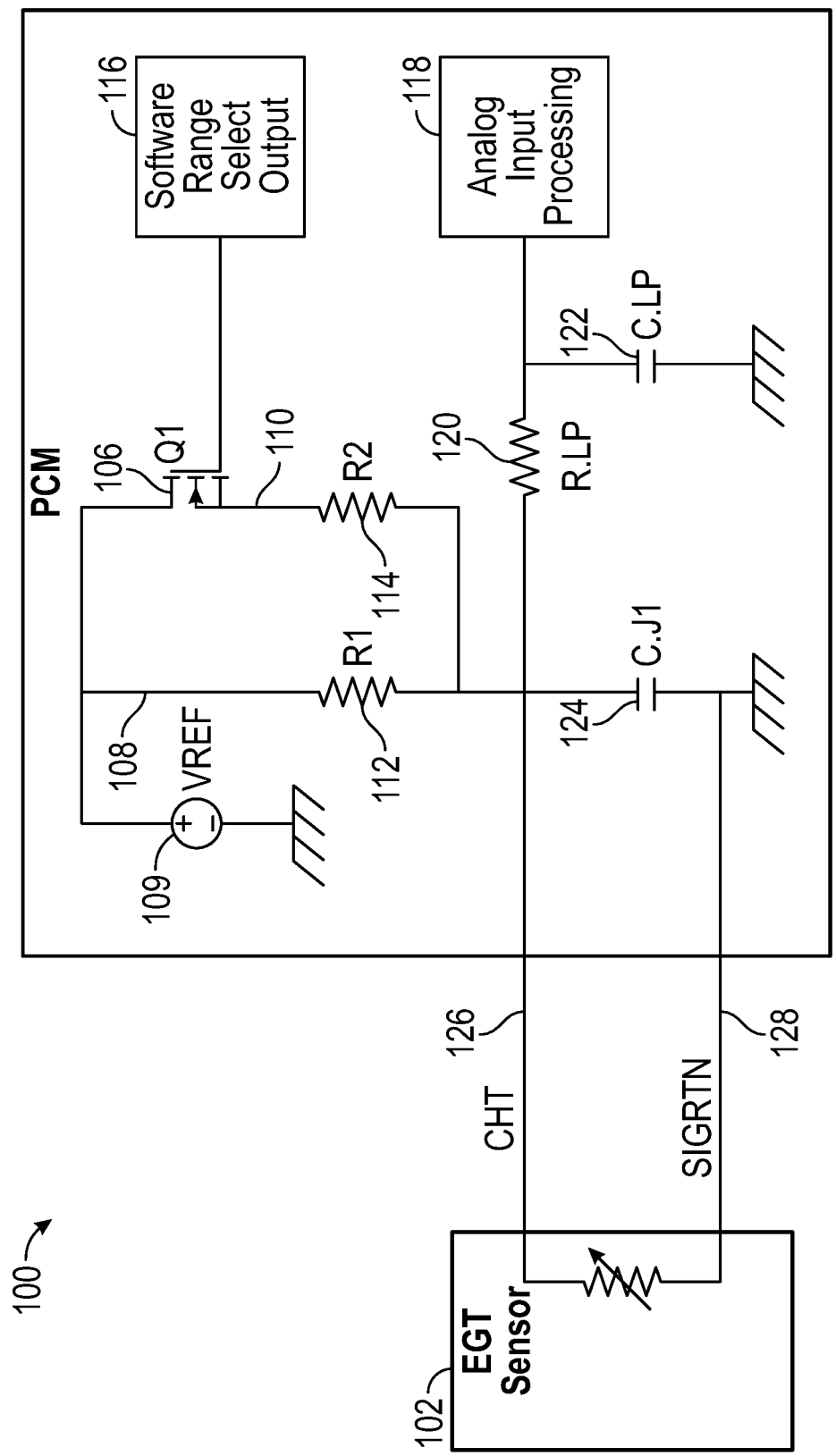
FIG. 1A depicts a schematic illustration of an example circuit, in accordance with one or more example embodiments of the disclosure.

This disclosure may relate to, among other things, a pulse switched high side driver for vehicle sensors. More particularly, in some embodiments, the disclosure may relate to exhaust gas temperature sensors in vehicles that are driven using a particular switched resistor interface configuration that may use a low resistance field effect transistor (FET) that is switched using a particular duty cycle. The switched resistor interface may include a first resistor connected to the thermistor and a FET connected in series to a second resistor that is then connected in parallel to the first resistor and the thermistor. The first resistor may be a higher resistance value resistor and the second resistor may be a lower resistance value resistor. The FET may be used to switch between the higher value resistor while the thermistor is operating in a lower end of the exhaust gas temperature range and the lower resistance value resistor while the thermistor is operating in a higher end of the exhaust gas temperature range. Examples of resistance values and/or temperature ranges may be provided below. The use of the higher value resistance in the lower end of the exhaust gas temperature range and the lower value resistor in the higher end of the exhaust gas temperature range may serve to mitigate some of the disadvantages of using a thermistor to perform temperature measurements over a large range of temperatures as may be described below. For example, the systems and methods described herein may improve the accuracy of thermistor exhaust gas temperature sensors at the lower and higher end of the exhaust gas temperature range. The application of the system and methods described herein are not necessarily intended to be limited to only exhaust gas temperature sensors, and may also be applied to any other type of vehicle sensor as well.

Thermistors may be sensors that produce different resistance values based on the temperature they are exposed to. Thermistors may be associated with a temperature coefficient of 5 mV/° C., for example, which may make the thermistor input less sensitive to vehicle electronic control unit (ECU) inaccuracy. Thermistors may also be a lower cost ceramic technology, which may make them cheaper to implement in vehicle system. However, thermistors may also be associated with accuracy issues in some instances. This may be because the resistance produced by the thermistor relative to a given temperature may be a third order logarithmic function, so the thermistor may experience a significant change in resistance across a given temperature range. For example, the resistance value of the thermistor may be hundreds or thousands of kilo ohms at lower temperatures (for example, below 180° C.) in the exhaust gas temperature range, and may drop down to hundreds or tens of ohms at higher temperatures (for example, as the temperature approaches above 400-500° C. This may cause thermistor outputs to be essentially unreadable by an analog to digital converter (ADC) of the vehicle system at these lower temperatures when coupled to a simple pull-up resistor interface. This may be because the relatively high resistance of the thermistor may result in a relatively small current output by the thermistor, and this small current output may be negligible to the ADC and indistinguishable from noise factors in the circuit, such as ADC accuracy. The thermistors may also be associated with inaccuracies at the higher end of the exhaust gas temperature range as well, as is described below. These disadvantages of thermistors may be problematic when thermistors are used for EGT measurements because exhaust gas may span massive temperature ranges (for example, −40° C. to at least 850° C.). Thus, a thermistor may only be effective for data collection in a smaller subrange of the total exhaust gas temperature range.

In some embodiments, the systems and methods described herein may employ a switched resistor interface (an example of which may be provided in FIG. 1A). The switched resistor interface may be used to improve the accuracy of the data produced by thermistors across the temperature range associated with vehicle exhaust gas, and may allow exhaust temperature values to be ascertained even when the thermistors are operating in the colder temperature range of the exhaust gas. The switched resistor interface may be in the form of a circuit coupled between a computing device used to drive the thermistor and the thermistor itself. The switched resistor interface may include two different resistors connected in parallel between a transistor, such as a field effect transistor (FET), and the thermistor. The computing device may provide a signal to the FET that may cause the FET to switch between the first resistor branch alone or with the second resistor branch in parallel to the first resistor branch. The first resistor may be associated with a higher resistance value than the second resistor. The FET may be switched to the branch including the first resistor when the thermistor is operating in lower temperature range (for example, below 180° C., as well as any other temperature range) of the full exhaust gas temperature range. The FET may then be switched to the branch including the second resistor when the thermistor is operating in a higher temperature range (for example, above 180° C., as well as any other temperature range) of the full exhaust gas temperature range. The higher resistance value resistor may be used when the thermistor is operating in the colder temperature range because the thermistor may produce a larger resistance value at colder temperatures. The lower resistance value resistor may be used when the thermistor is operating in the higher temperature range because the thermistor may provide a smaller resistance value at higher temperatures. The following may exemplify the benefits of using the circuit configuration described above. The common thermistor may be about 100 ohms when it is in a hot temperature range, for example. If a 1 k pull-up resistor is used, then the voltage that is read mean be around 0.5 volts. When the thermistor is cold, its value may be above 1 Mohm, for example. In this situation, the system may be attempting to read 5V*(1−0.001), which may equal 1 least significant bit (LSB) of the ADC, which may result in an inability to make temperature determinations. If, instead, a 100 k pull-up resistor is used, then the reading may be at 4.5 volts. The log response of a thermistor with a fixed pull-up may provide an 's' shaped transfer function that disappears into the error margin at both ends. However if a second value is switched in, then both limits may be pulled away from the error floor and the thermistor may be read over a full temperature range. The systems and methods described herein provide additional advantages. For example, by using an exceptionally low value hot range resistor, regaining temperature accuracy, and pulsing the signal to keep thermal dissipation down in both sensor and resistor, with synchronized ADC reads.

In some embodiments, in addition to allowing thermistors to be used in the lower temperature operating range of the exhaust gas, the switched resistor interface described herein may also address the accuracy disadvantages associated with the thermistors in the higher temperature range of the exhaust gas. The accuracy disadvantages may occur because some causes of error, such as ADC error, may be fixed in amplitude regardless of the voltage read. The contribution to error of an example 5V 10-bit ADC with an error of +/−2 counts, may be 2/1024 when reading 5.0V (0.2%) but 2/10 when reading 50 mV (20%). Furthermore, resistors can be obtained at much better tolerances, such as 0.1%, than thermistors. In a voltage divider the combined tolerance may be dominated by the lower value resistor. Therefore it may be desirable to use a fixed resistor approximately equal to or lower than the resistance of the thermistor in the temperature range of interest. This may be accomplished by using a lower resistance value resistor and a lower resistance value FET in the switched resistor interface. The lower resistance value resistor (for example, R2 depicted in FIG. 1A) may be the resistor that is used at the higher end of the exhaust gas temperature range (for example, temperatures above 180° C.). For example, the resistance of the FET may be less than 0.5 ohms and the resistance of the resistor may be 100 ohms. However, any other resistance values may be used as well. The FET may be used to switch to the branch including this lower resistance value resistor when the transistor begins producing lower resistance values as the temperature of the exhaust gas increases. The use of the lower resistance value resistor at the higher end of the exhaust gas temperature range may improve the accuracy of the thermistor EGT sensor readings. As described above, a higher resistance value resistor for the higher end of the exhaust gas temperature range may result in inaccuracies in data readings because the values at the ADC may be lower. This may be problematic because the ADC may be association with a given amount of error, and if the values of the ADC are lower, then the error may become a more significant factor in the values being produced by the ADC. By using the lower resistance value resistor for the higher end of the exhaust gas temperature range, current flowing through the resistor may be increased, which may result in higher values at the ADC. This may serve to mitigate the error of the ADC as a factor in the output produced by the ADC.

While the use of the lower resistance value resistor that is used during the higher temperature range of the EGT thermistor may reduce ADC reading inaccuracies, the lower resistance resistor may be associated with certain disadvantages. For example, the lower resistance value resistor may be associated with power dissipation issues and self-heating issues. Power dissipation issues may occur during a fault condition when the voltage source connected to the resistor may short to the voltage of the vehicle battery. For example, if the battery voltage is 16 volts and the voltage source connected to the resistor is 5 volts, then the voltage across the resistor may be 11 volts, which may result in a certain amount of power flowing through the resistor. This power may need to be dissipated using additional circuit elements. Self-heating may be caused by high currents flowing through the thermistor via the resistor (for example, the current may cause the thermistor to increase in temperature). Any self-heating of the thermistor may degrade temperature accuracy. As an example, if the resistor has a resistance of 100 ohms and the thermistor has a resistance of 100 ohms, and the voltage source has a voltage of 5 volts, then the power through the resistor would be 63 milliwatts. To mitigate these potential disadvantages, the switched resistor interface described herein may also switch the FET connected to the two resistors to the branch associated with the lower resistance value resistor for only a brief period of time. That is, the FET may be switched such that the thermistor is driven by the branch of the switched resistor interface including the lower resistance value resistor for a brief period of time. The FET may be switched to the lower resistance value resistor using a signal from a computing device. In some cases, the signal may be a pulse width modulated (PWM) signal associated with a particular duty cycle. The duty cycle, for example, may include an "on" period (for example, a period during which the signal is a non-zero value above a threshold value) of 10 milliseconds, and an "off" period (for example, a period during which the signal is a zero value or a value below the threshold value) of 490 milliseconds (e.g., 2% FET ON duty cycle, low resistance, high current). The duty cycle may determine the self-heating and power dissipation, and values below 10% may provide the advantages described herein. The upper limit frequency for the PWM may be determined by the settling time of the protection and filter capacitors for the ADC. This can be arranged to be fast, down to 100 us on-time. The lower frequency limit may be a factor of the data rate required for control and diagnostics and the time-constant of the sensor, which may be a few seconds or faster. As the control module may be unable to read the temperature during the off period, regular on periods may be advantageous for control purposes.

Furthermore, the switched resistor interface described herein may also involve the synchronization of the ADC to the duty cycle used to switch the FET. That is, the ADC may be used to read values produced by the thermistor at the end of the "on" portion of the duty cycle. This may serve for minimum self-heating to achieve a settled circuit voltage at the ADC filter.

In summary, some of the benefits of the switched resistor interface described herein may include the ability to use lower cost thermistors that may cover a full temperature range (for example, −40° C. to 850° C.), while mitigating potential disadvantages associated with these thermistors. That is, the switched resistor interface may allow for thermistor readings of exhaust gas temperatures to be performed at colder temperatures and may also allow for the accuracy of thermistor readings at higher exhaust gas temperature to be performed with improved accuracy.

Illustrative Circuit

Figure 1B:
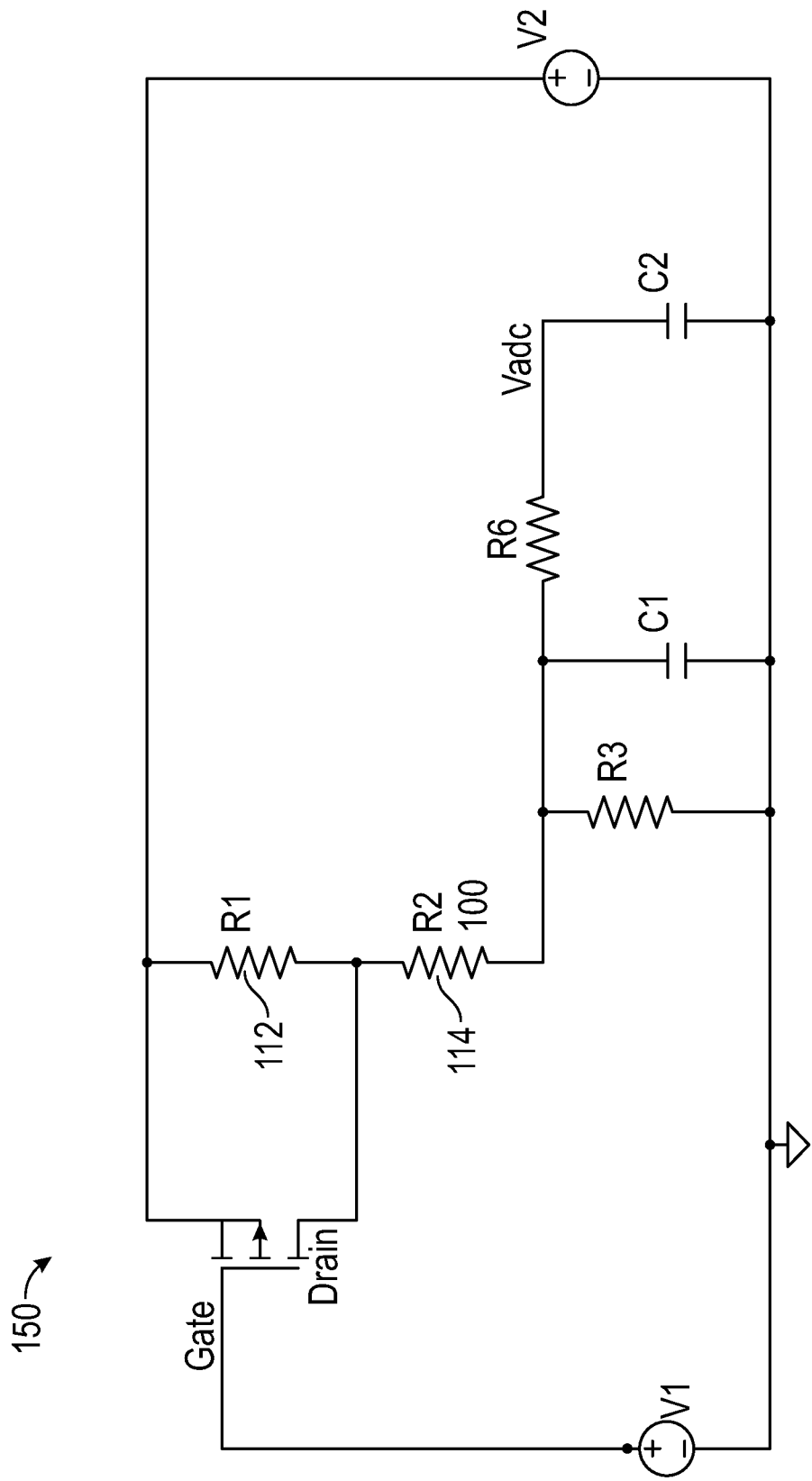
FIG. 1B depicts a schematic illustration of an example circuit, in accordance with one or more example embodiments of the disclosure.

Turning to the figures, FIG. 1A illustrates an example circuit 100, in accordance with one or more embodiments of this disclosure. The example circuit 100 may include an example switched resistor interface used for improved thermistor accuracy throughout the entire exhaust gas temperature range. In some embodiments, the circuit 100 may include one or more sensors 102 (which may be referred to as "thermistor 102" hereinafter, but may also include any other type of sensor), which may be connected to a first resistor 112 and a second resistor 114. The first resistor 112 and a second resistor may be connected in parallel to a FET 106, and the FET 106 may be connected to a computing device 116. The circuit 100 may also include one or more low pass filters (for example, an RLP low pass filter 120 and/or a CLP low pass filter 122) that may be used as noise filters and an analog to digital converter (ADC) 118. The circuit 100 may also include a voltage source 109 that may be used to provide a current through the first resistor 112 or second resistor 114 and the thermistor 102. In some instances, the voltage source 109 may be provided by the computing device 116 (for example, an internal 5V used for ECU Analog circuity). However, it should be noted that this example circuit configuration depicted in circuit 100 may only be one example circuit configuration and any number of other circuit configurations may similarly be used. For example, FIG. 1B may depict a second example circuit 150 configuration in which the first resistor 112 and second resistor 114 are in series.

In some embodiments, the circuit used to drive the one or more sensors 102 may include the computing device 116, the FET 106, the first resistor 112, and the second resistor 114. The computing device may be any computing device that may be used to provide a signal output to the FET 106. For example, the computing device 116 may be a microprocessor that may include a general purpose pin for providing such a signal. In some cases, the computing device 116 may represent the vehicle's engine control unit (ECU). However, the computing device 116 may not necessarily be limited in this manner. The computing device 116 may include any elements of the computing device 300 described with respect to FIG. 3. The FET 106 may be a transistor that is used as a switch to control which of the first resistor 112 or the second resistor 114 are connected to the thermistor 102. For example, the computing device 116 may provide a first signal to the FET 106 to switch the FET 106 to connect the first branch 108 including the first resistor 112 to the thermistor 102, or may send a second signal to the FET 106 to switch the FET 106 to connect the second branch 110 including the second resistor 114 to the thermistor 102. The thermistor itself may include an output 126 that may be provided to the ADC 118. The output 126, for example, may be a voltage and/or current value that may be received by the ADC 118. The ADC 118 may convert the analog voltage and/or current value into a digital format to be provided to a processing element of the vehicle, such as the ECU of the vehicle, for example. The thermistor 102 may also include a SIGRTN branch 128. The purpose of the SIGRTN branch 128 may be to prevent ground currents from the computing device 116 from effecting the accuracy of ADC 118.

In some embodiments, the first resistor 112 may be a higher resistance value resistor that may be connected to the thermistor 102 when the thermistor 102 is exposed to colder exhaust gas in a lower temperature range. The resistance value of the first resistor 112 may be somewhere mid-range of the thermistor at the temperatures of interest, such as 50 k ohms, for example, but may also be any other resistance value. Additionally, the colder temperature range, for example, may include temperatures below 180° C., but may also include any other temperature range. The first resistor 114 may be a lower resistance value resistor that may be connected to the thermistor 102 when the thermistor 102 is exposed to hotter exhaust gas in a hotter temperature range. The resistance value of the second resistor 114 may be 100 ohms, for example, but may also be any other resistance value. Additionally, the hotter temperature range, for example, may include temperatures above 180° C., but may also include any other temperature range. The first resistor 112 may be connected to the thermistor 102 when the exhaust gas temperature is in the colder temperature range because the resistance of the thermistor 102 may be higher when it is exposed to temperatures in the colder temperature range. Likewise, the second resistor 114 may be connected to the thermistor 102 when the exhaust gas temperature is in the hotter temperature range because the resistance of the thermistor 102 may be higher when it is exposed to temperatures in the hotter temperature range.

While using a lower resistance value resistor for the second resistor 114 that is used during the higher temperature range of the EGT thermistor may reduce ADC 118 reading inaccuracies, using such a lower resistance resistor may be associated with certain disadvantages. For example, the lower resistance value resistor may be associated with power dissipation issues and self-heating issues. Power dissipation issues may occur during a fault condition when the voltage source connected to the resistor may short to the voltage of the vehicle battery. For example, if the battery voltage is 16 volts and the voltage source connected to the resistor is 5 volts, then the voltage across the resistor may be 11 volts, which may result in a certain amount of power flowing through the resistor. This power may need to be dissipated using additional circuit elements. Self-heating may be caused by high currents flowing through the resistor (for example, the current may cause the resistor to increase in temperature). As an example, if the resistor 114 has a resistance of 100 ohms and the thermistor 102 has a resistance of 100 ohms, and the voltage source 109 has a voltage of 5 volts, then the power through the resistor may be 63 milliwatts. To mitigate these potential disadvantages, the switched resistor interface described herein may also switch the FET 106 connected to the two resistors to the branch associated with the lower resistance value resistor for only a brief period of time. That is, the FET 106 may be switched such that the thermistor 102 is driven by the branch 110 of the switched resistor interface including the lower resistance value resistor for a brief period of time. The FET 106 may be switched to the lower resistance value resistor using a signal from a computing device 116. In some cases, the signal may be a pulse width modulated (PWM) signal associated with a particular duty cycle. The duty cycle, for example, may include an "on" period (for example, a period during which the signal is a non-zero value above a threshold value) of 10 milliseconds, and an "off" period (for example, a period during which the signal is a zero value or a value below the threshold value) of 490 milliseconds.

Furthermore, the switched resistor interface described herein may also involve the synchronization of the ADC 116 to the duty cycle used to switch the FET 106. That is, the ADC 116 may be used to read values produced by the thermistor at the end of the "on" portion of the duty cycle.

Illustrative Methods

Figure 2:
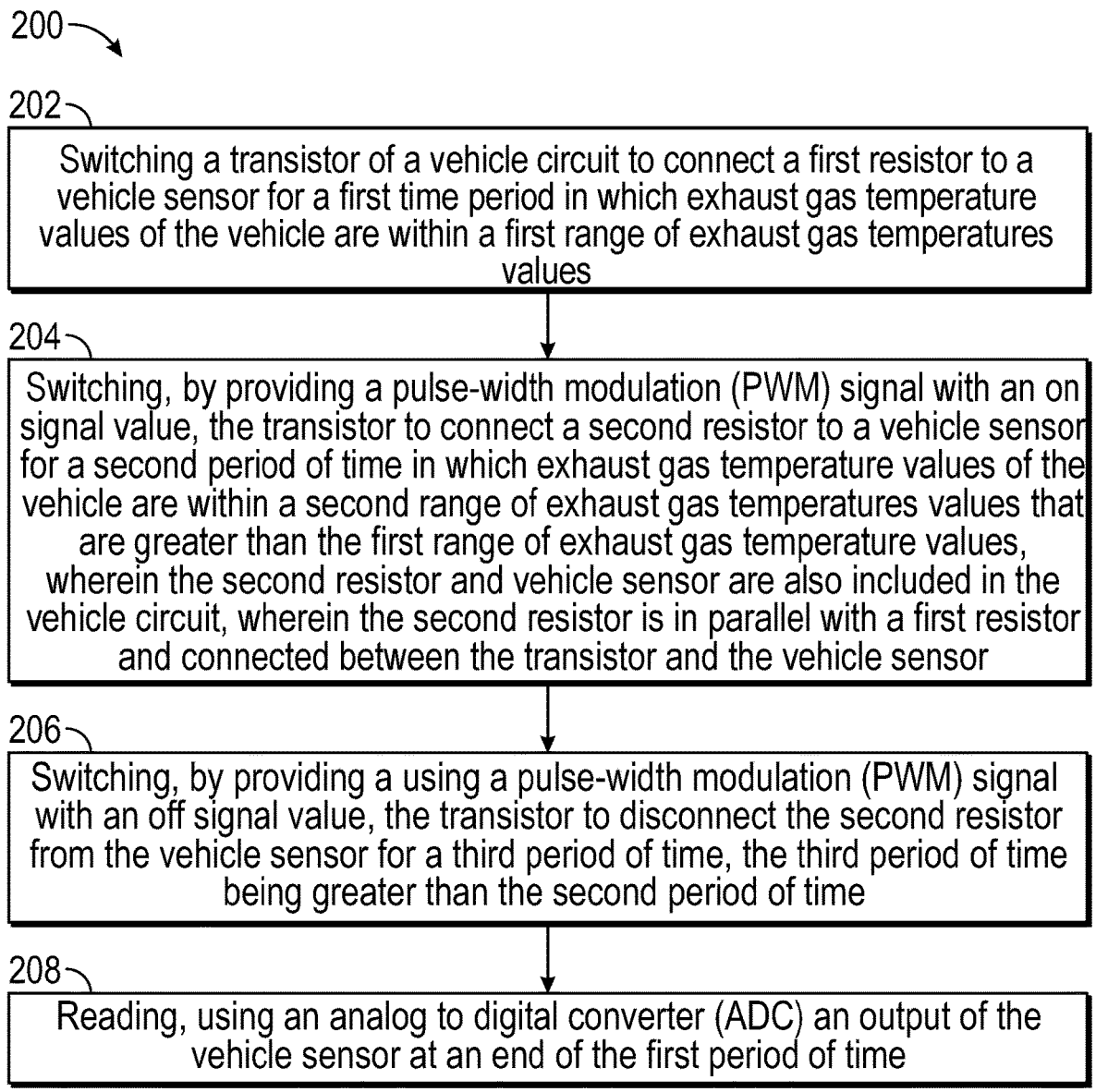
FIG. 2 depicts an example method, in accordance with one or more example embodiments of the disclosure.

FIG. 2 is an example method 200. In some embodiments, the method 200 may be implemented by the FET switching module(s) 314 of FIG. 3 (described below). For example, the method may be implemented by the computing device 116, computing device 300, or any other computing device described herein or otherwise. At block 202 of the method 200 in FIG. 2, the method may include switching a transistor of a vehicle circuit to connect a first resistor to a vehicle sensor for a first time period in which exhaust gas temperature values of the vehicle are within a first range of exhaust gas temperatures values. Block 204 of the method 200 may include switching, by providing a pulse-width modulation (PWM) signal with an on signal value, the transistor to connect a second resistor to a vehicle sensor for a second period of time in which exhaust gas temperature values of the vehicle are within a second range of exhaust gas temperatures values that are greater than the first range of exhaust gas temperature values, wherein the second resistor and vehicle sensor are also included in the vehicle circuit, wherein the second resistor is in parallel with a first resistor and connected between the transistor and the vehicle sensor. Block 206 of the method 200 may include switching, by providing a pulse-width modulation (PWM) signal with an off signal value, the transistor to disconnect the second resistor from the vehicle sensor for a third period of time, the third period of time being greater than the second period of time. Block 208 of the method 200 may include reading, using an analog to digital converter (ADC) an output of the vehicle sensor during or after the first period of time.

In some embodiments, the method 200 may involve two periods: ON-time and OFF-time. The method 200 may use a 10 ms operating tick time (as well as any other tick time).

The method may include a first subroutine that determines if a counter equals zero and if the thermistor is in a hot temperature range, then the PWM signal is switched ON by the gate. If the PWM is on, then the ADC may be read, and the PWM may be switched OFF. The counter may then be incremented. These operations may be repeated until the counter is equal to a number (for example, 49). The operations then return to the first subroutine. This is merely one particular example of how the method 200 may be implemented, and the method 200 may similarly be implemented in any number of other manners.

The operations described and depicted in the illustrative process flow of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

Illustrative Computing Device

Figure 3:
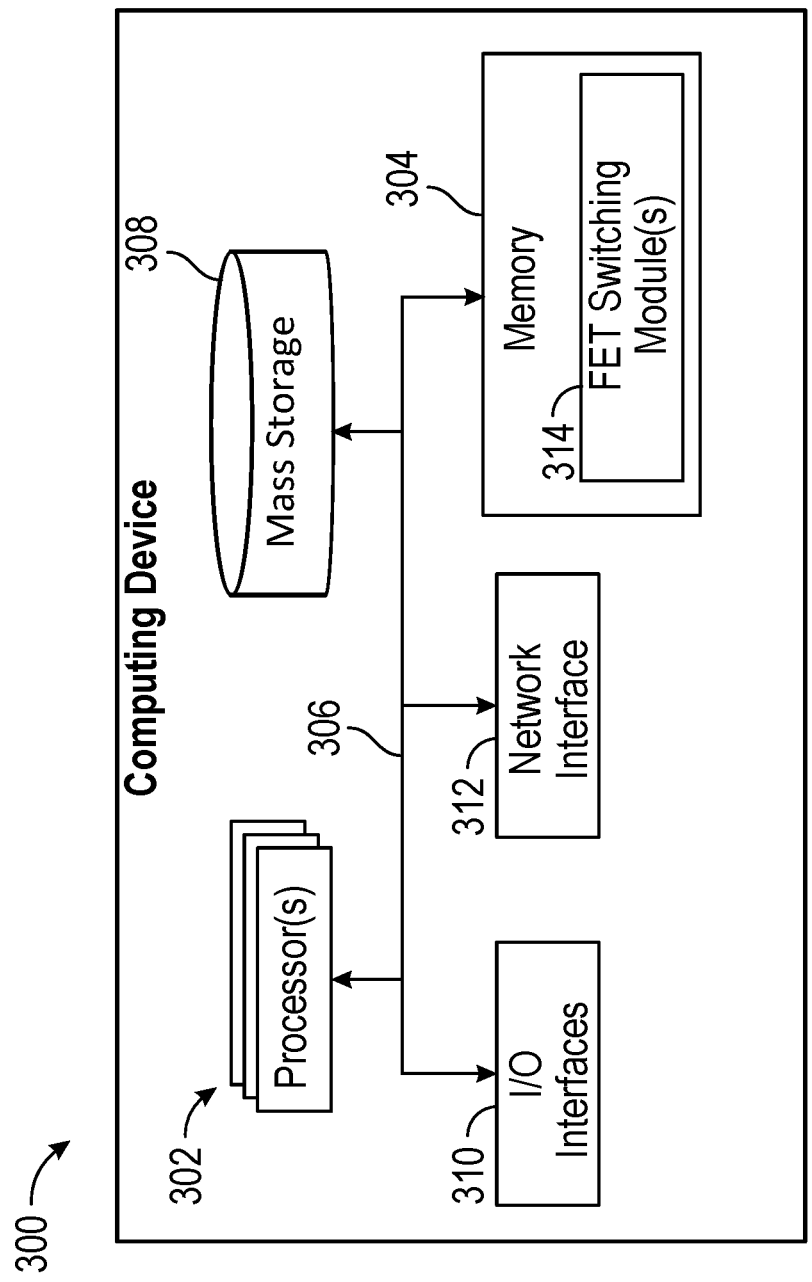
FIG. 3 depicts a schematic illustration of an example computing device architecture, in accordance with one or more example embodiments of the disclosure.

FIG. 3 illustrates an example computing device 300, in accordance with one or more embodiments of this disclosure. The computing 300 device may be representative of any number of elements described herein, such the computing device 116, or any other element described herein. The computing device 300 may include at least one processor 302 that executes instructions that are stored in one or more memory devices (referred to as memory 304). The instructions can be, for instance, instructions for implementing functionality described as being carried out by one or more modules and systems disclosed above or instructions for implementing one or more of the methods disclosed above. The processor(s) 302 can be embodied in, for example, a CPU, multiple CPUs, a GPU, multiple GPUs, a TPU, multiple TPUs, a multi-core processor, a combination thereof, and the like. In some embodiments, the processor(s) 302 can be arranged in a single processing device. In other embodiments, the processor(s) 302 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 302 can access the memory 304 by means of a communication architecture 306 (e.g., a system bus). The communication architecture 306 may be suitable for the particular arrangement (localized or distributed) and type of the processor(s) 302. In some embodiments, the communication architecture 306 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 304 also can retain data.

Each computing device 300 also can include mass storage 308 that is accessible by the processor(s) 302 by means of the communication architecture 306. The mass storage 308 can include machine-accessible instructions (e.g., computer-readable instructions and/or computer-executable instructions). In some embodiments, the machine-accessible instructions may be encoded in the mass storage 308 and can be arranged in components that can be built (e.g., linked and compiled) and retained in computer-executable form in the mass storage 308 or in one or more other machine-accessible non-transitory storage media included in the computing device 300. Such components can embody, or can constitute, one or many of the various modules disclosed herein. Such modules are illustrated as FET switching module(s) 314. In some instances, the modules may also be included within the memory 304 as well.

Execution of the FET switching modules 314, individually or in combination, by at least one of the processor(s) 302, can cause the computing device 300 to perform any of the operations described herein (for example, the operations described with respect to FIG. 2, as well as any other operations). For example, the FET switching modules 314 may be implemented at the computing device 300, the computing device 116, or any other computing device described herein or otherwise.

Each computing device 300 also can include one or more input/output interface devices 310 (referred to as I/O interface 310) that can permit or otherwise facilitate external devices to communicate with the computing device 300. For instance, the I/O interface 310 may be used to receive and send data and/or instructions from and to an external computing device.

The computing device 300 also includes one or more network interface devices 312 (referred to as network interface(s) 312) that can permit or otherwise facilitate functionally coupling the computing device 300 with one or more external devices. Functionally coupling the computing device 300 to an external device can include establishing a wireline connection or a wireless connection between the computing device 300 and the external device. The network interface devices 312 can include one or many antennas and a communication processing device that can permit wireless communication between the computing device 300 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts.

The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A system comprising:
    a vehicle sensor for sensing exhaust gas temperature values;
    a transistor;
    a first resistor in parallel with a second resistor and connected between the vehicle sensor and the transistor, wherein the transistor is configured to selectively connect the first resistor to the vehicle sensor during a first time period in which exhaust gas temperature values of the vehicle are within a first range of exhaust gas temperatures values;
    a processor; and
    a memory storing computer-executable instructions, that when executed by the processor, cause the processor to:
        switch, by providing a pulse-width modulation (PWM) signal with an on signal value, the transistor to connect the second resistor to the vehicle sensor for a second period of time in which exhaust gas temperature values of the vehicle are within a second range of exhaust gas temperatures values that are greater than the first range of exhaust gas temperature values;
        switch, by providing a pulse-width modulation (PWM) signal with an off signal value, the transistor to disconnect the second resistor from the vehicle sensor for a third period of time, the third period of time being greater than the second period of time; and
        read, using an analog to digital converter (ADC) an output of the vehicle sensor during or after the first period of time,
    wherein a resistance of the transistor is a lower value than a resistance of the second resistor.

2. The system of claim 1, wherein the vehicle sensor is an Exhaust Gas Temperature (EGT) sensor.

3. The system of claim 1, wherein the first period of time is 10 microseconds and the second period of time is 490 microseconds.

4. The system of claim 1, wherein the computer-executable instructions further cause the processor to:
    switch the transistor on using a pulse-width modulation (PWM) signal with an on signal value for a third period of time; and
    switch the transistor off using the PWM signal with an off signal value for a fourth period of time, the fourth period of time being greater than the third period of time, and wherein the third period of time is different than the first period of time and the fourth period is different than the second period of time.

5. The system of claim 1, wherein the second resistor is in series with the transistor.

6. The system of claim 1, further comprising a low-pass filter, a first capacitor, and a second capacitor.

7. A circuit comprising:
    a vehicle sensor for sensing exhaust gas temperature values;
    a transistor;
    a first resistor in parallel with a second resistor and connected between the vehicle sensor and the transistor, wherein the transistor is configured to selectively connect the first resistor to the vehicle sensor during a first time period in which exhaust gas temperature values of the vehicle are within a first range of exhaust gas temperatures values;
    a processor; and
    a memory storing computer-executable instructions, that when executed by the processor, cause the processor to:

switch, by providing a pulse-width modulation (PWM) signal with an on signal value, the transistor to connect the second resistor to the vehicle sensor for a second period of time in which exhaust gas temperature values of the vehicle are within a second range of exhaust gas temperatures values that are greater than the first range of exhaust gas temperature values;

switch, by providing a pulse-width modulation (PWM) signal with an off signal value, the transistor to disconnect the second resistor from the vehicle sensor for a third period of time, the third period of time being greater than the second period of time;

read, using an analog to digital converter (ADC) an output of the vehicle sensor during or after the first period of time;

switch the transistor on using a pulse-width modulation (PWM) signal with an on signal value for a third period of time; and switch the transistor off using the PWM signal with an off signal value for a fourth period of time, the fourth period of time being greater than the third period of time, and wherein the third period of time is different than the first period of time and the fourth period is different than the second period of time.

8. The circuit of claim 7, wherein the vehicle sensor is an Exhaust Gas Temperature (EGT) sensor.

9. The circuit of claim 7, wherein a resistance of the transistor is a lower value than a resistance of the second resistor.

10. The circuit of claim 7, wherein the first period of time is 10 microseconds and the second period of time is 490 microseconds.

11. The circuit of claim 7, wherein the second resistor is in series with the transistor.

12. The circuit of claim 7, further comprising a low-pass filter, a first capacitor, and a second capacitor.

13. A method comprising:

switching a transistor of a vehicle circuit to connect a first resistor to a vehicle sensor for a first time period in which exhaust gas temperature values of the vehicle are within a first range of exhaust gas temperatures values;

switching, by providing a pulse-width modulation (PWM) signal with an on signal value, the transistor to connect a second resistor to the vehicle sensor for a second period of time in which exhaust gas temperature values of the vehicle are within a second range of exhaust gas temperatures values that are greater than the first range of exhaust gas temperature values, wherein the second resistor and vehicle sensor are also included in the vehicle circuit, wherein the second resistor is in parallel with a first resistor and connected between the transistor and the vehicle sensor;

switching, by providing a pulse-width modulation (PWM) signal with an off signal value, the transistor to disconnect the second resistor from the vehicle sensor for a third period of time, the third period of time being greater than the second period of time; and reading, using an analog to digital converter (ADC) an output of the vehicle sensor during or after the first period of time, wherein the second resistor is in series with the transistor.

14. The method of claim 13, wherein the vehicle sensor is an Exhaust Gas Temperature (EGT) sensor.

15. The method of claim 13, wherein a resistance of the transistor is a lower value than a resistance of the second resistor.

16. The method of claim 13, wherein the first period of time is 10 microseconds and the second period of time is 490 microseconds.

17. The method of claim 13, further comprising:

switching the transistor on using a pulse-width modulation (PWM) signal with an on signal value for a third period of time; and switching the transistor off using the PWM signal with an off signal value for a fourth period of time, the fourth period of time being greater than the third period of time, and wherein the third period of time is different than the first period of time and the fourth period is different than the second period of time.

* * * * *